(12) United States Patent
Jouppi et al.

(10) Patent No.: US 8,718,301 B1
(45) Date of Patent: May 6, 2014

(54) TELESCOPIC SPATIAL RADIO SYSTEM

(75) Inventors: Norman Paul Jouppi, Palo Alto, CA (US); Subramoniam N. Iyer, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2467 days.

(21) Appl. No.: 10/973,794

(22) Filed: Oct. 25, 2004

(51) Int. Cl.
*H04R 5/033* (2006.01)
*H04S 7/00* (2006.01)

(52) U.S. Cl.
CPC ............. *H04S 7/303* (2013.01); *H04S 2420/01* (2013.01)
USPC .......................................................... 381/310

(58) Field of Classification Search
USPC ............. 381/310, 17, 309, 18, 19, 58, 59, 74, 381/77, 80, 85
See application file for complete search history.

(56) References Cited

U.S. PATENT DOCUMENTS

| 5,438,623 | A | 8/1995 | Begault |
| 5,802,180 | A | 9/1998 | Abel et al. |
| 5,809,149 | A | 9/1998 | Cashion et al. |
| 5,946,400 | A | 8/1999 | Matsuo |
| 6,741,706 | B1 * | 5/2004 | McGrath et al. ................ 381/22 |
| 7,218,240 | B2 * | 5/2007 | Tillotson ....................... 340/692 |
| 2003/0053634 | A1 | 3/2003 | McGrath et al. |
| 2003/0059070 | A1 | 3/2003 | Ballas |
| 2003/0223602 | A1 | 12/2003 | Eichler et al. |

* cited by examiner

*Primary Examiner* — Duc Nguyen
*Assistant Examiner* — Kile Blair

(57) ABSTRACT

A telescopic spatial radio system is provided for sending a signal representative of a sound at a speaker location to a listener location, the signal providing positioning information of the speaker location relative to the listener location and processing the signal using the positioning information to provide a telescopic zoomable binaural sound at the listener location having a simulated spatial relationship based on the position information of the speaker location relative to the listener location.

21 Claims, 2 Drawing Sheets

TELESCOPIC SPATIAL RADIO SYSTEM

TECHNICAL FIELD

The present invention relates generally to communication systems, and more specifically to spatial radio systems.

BACKGROUND ART

In many applications involving remote communication between people, situational awareness of the relative positions of the participants can vary from a pleasant feature to providing critical information. For example in search and rescue applications, it can be critically important to know the relative heading to other team members as they speak. In social applications, spatial audio may merely create a richer and more enjoyable user experience. When people are within natural speaking distances of each other, the relative positions of speakers is immediately conveyed by the perceived direction of their voices. Providing the same directional advantages enjoyed by collocated speakers to geographically distributed remote speakers could significantly enhance their situational awareness.

Remote communication systems usually need to support multiple actively speaking users. However, current radio and walkie-talkie systems only support a single active speaker at a time per radio channel. In the case of more than one active speaker, all the speakers or all the speakers except the loudest may be garbled.

DISCLOSURE OF THE INVENTION

The present invention provides a telescopic spatial radio system for sending a signal representative of a sound at a speaker location to a listener location, the signal providing positioning information of the speaker location relative to the listener location and processing the signal using the positioning information to provide a telescopic binaural sound at the listener location having a simulated spatial relationship based on the position information of the speaker location relative to the listener location.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
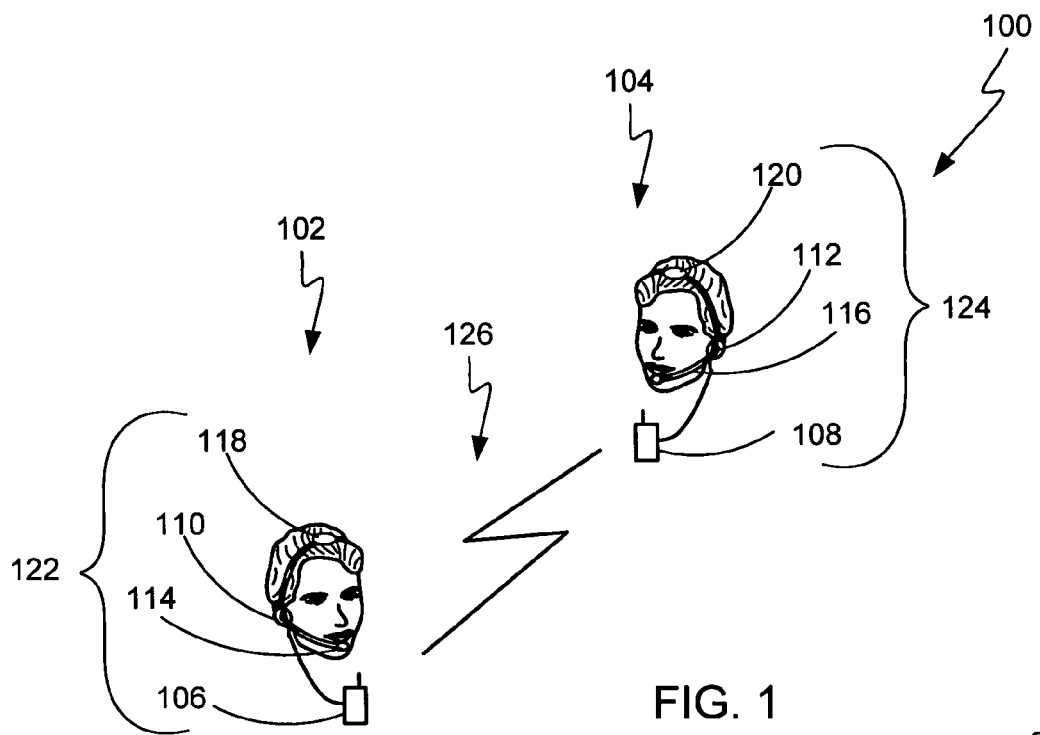
FIG. 1 is a Telescopic Spatial Radio (TSR) system 100 in accordance with an embodiment of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the apparatus/device are semi-diagrammatic and not to scale and, particularly, some of the dimensions are for the clarity of presentation and are shown greatly exaggerated in the FIGs. In addition, where multiple embodiments are disclosed and described having some features in common, for clarity and ease of illustration, description, and comprehension thereof, like features one to another will ordinarily be described with like reference numerals.

In the embodiments of the present invention, systems are modeled on co-located speakers to enable the users of the systems to perceive the voices of geographically distributed simultaneous speakers as coming from different directions. If the angle between the speakers were significantly different for a given listener, the listener could selectively attend to the speaker of their choice using human perceptual abilities commonly known as the "cocktail party effect".

At a cocktail party, individuals with normal hearing can use both their ears and brain to selectively attend to and participate in multiple simultaneous conversations. In contrast, when multiple speakers are talking over the single audio channel, the result is usually completely unintelligible (unless one speaker is much louder than the others).

The present invention provides advantages of co-located speakers to distributed remote speakers and is referred to as "Telescopic Spatial Radio" since it maintains the relative orientation of speakers and listeners, but at seemingly much reduced distances. This is similar to the use of telescopes to make objects at given headings appear closer.

Referring now to FIG. 1, therein is shown a Telescopic Spatial Radio (TSR) system 100 in accordance with an embodiment of the present invention. In the TSR system 100, geographically distributed people at first and second locations 102 and 104 communicate with each other using TSR devices 106 and 108 similar to radios, walkie-talkies, or cellphones. having microprocessors for signal processing, position, and orientation tracking capabilities. However, the TSR devices 106 and 108 are augmented with headphone headsets 110 and 112, respectively, having microphones 114 and 116, respectively. The TSR devices 106 and 108 also have tracking devices 118 and 120, respectively, attached to the headphone headsets 110 and 112.

Depending on which system is being used by a speaker or a listener, the TSR devices, the headphone headsets, the microphones, and the tracking devices are referred to as the speaker TSR system or the listener TSR system, respectively. For example, if the user at the first location 102 is speaking, the TSR device 106, the headphone headset 110, the microphone 114, and the tracking device 118 are collectively referred to as the speaker TSR system 122. If the user at the second location 104 is listening, the TSR device 108, the headphone headsets 112, the microphone 116, and the tracking device 120 are collectively referred to as the listener TSR system 124.

The TSR devices 106 and 108 are connected either by a wireless computer network or by one or more conventional radio frequencies. The signal processing capabilities are used to spatially encode voice communication for output, over a listener's headphones using head-related transfer functions (HRTFs) to provide telescopic binaural sound at the listener location having a simulated spatial relationship based on the position information of the speaker location 102 relative to the listener location 104. Based on the location of the speaker TSR system 122, the location of the listener TSR system 124, and the orientation of the listener's head, the perception of the direction of the user of the speaker TSR system 122 could be immediately conveyed to the user of the listener TSR system 124.

For example, if the user of the listener TSR system 122 is facing true north, and the user of the speaker TSR system 124 is a mile away to the west (i.e. left), the speaker's voice will be processed to appear to be coming from the left of the user of the listener TSR system 124. If the listening user then turns his/her head while the speaking user continues to talk, the voice of the speaking user will appear to be fixed in space relative to the listening user. Similarly, if the speaking user is in a valley and the listening user is at the top of a hill, the speaking user's voice should be perceived as coming from below by the listening user at the elevation angle existing between the speaker TSR system 122 and the listener TSR system 124.

The above is accomplished by determining the orientation of the heads of the users and the positions of the speaker TSR system and the listener TSR system 124. In one embodiment, the tracking devices 118 and 120 include electronic compasses that provide individual compass headings as orientation information. In the same embodiment, the tracking devices 118 and 120 include global positioning systems (GPSs) that provide latitude, longitude, and elevation to within one meter accuracy as position information. The orientation and position information from the electronic compasses and GPSs are provided across an audio channel 126 of the TSR devices 106 and 108.

In addition as the name "Telescopic Spatial Radio" indicates, the TSR system 100 maintains the relative orientation of speakers and listeners, but at seemingly much reduced distances in a fashion similar to optical telescopes that make objects at given headings appear closer. This is described below in greater detail.

Figure 2:
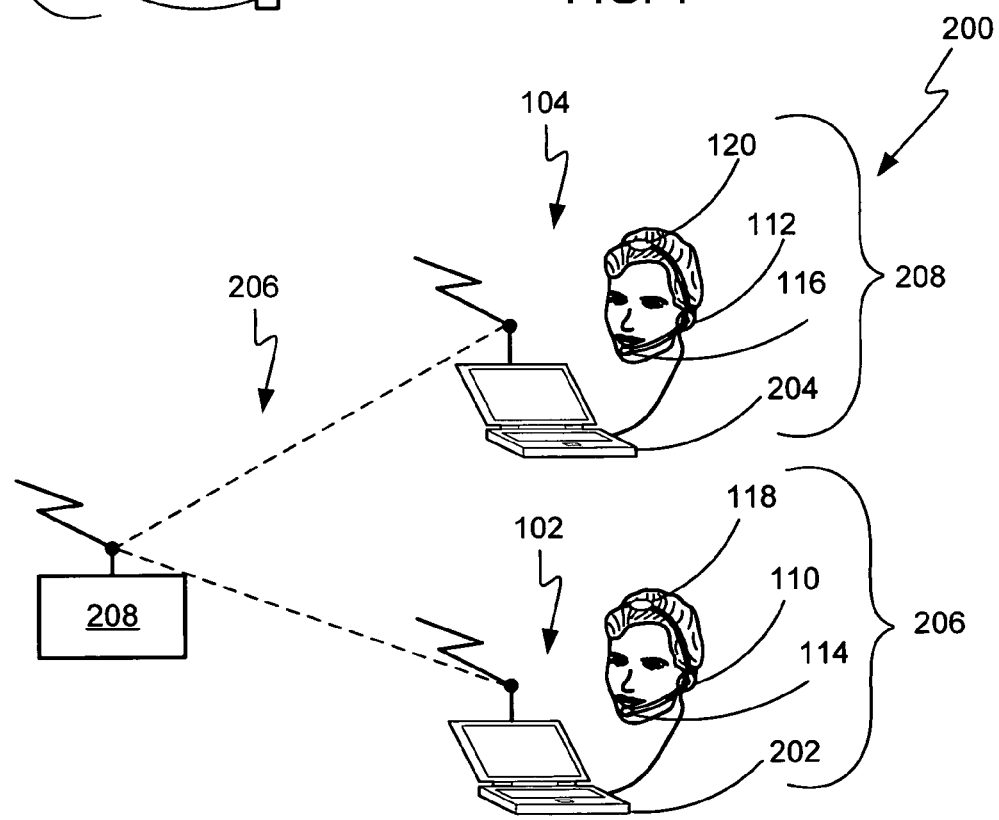
FIG. 2 is a centralized TSR system in accordance with another embodiment of the present invention.

Referring now to FIG. 2, therein is shown a centralized TSR system 200 in accordance with another embodiment of the present invention. The centralized TSR system 200 uses microprocessor based portable computers 202 and 204 as the TSR devices and has them connected by a wireless network 206. The portable computers 202 and 204 communicate with a server 208, which aggregates the voice traffic from each speaker and sends the combined data back to all the users.

The portable computers 202 and 204 are augmented with headphone headsets 110 and 112, respectively, having microphones 114 and 116, respectively. The portable computers 202 and 204 also have tracking devices 118 and 120, respectively, attached to the headphone headsets 110 and 112. The TSR system 200 allows users to select HRTFs from libraries on the portable computers 202 and 204, and to use the HRTFs to produce motion-tracked binaural sound for the users.

The centralized TSR system 200 can be especially useful in cases where users may be out of radio contact with each other, but are all connected to a transponder on high ground (including satellite systems). In the centralized TSR system 200, multiple audio streams from multiple simultaneous streams are combined in the server 208 and only a pair of audio channels is transmitted to each user.

As before, depending on which system is being used by a speaker or a listener, the TSR devices, the headphone headsets, the microphones, and the tracking devices are referred to as the speaker TSR system or the listener TSR system, respectively. For example, if the user at the portable computer 202 is speaking, the portable computer 202, the headphone headset 110, the microphone 114, and the tracking device 118 are collectively referred to as the speaker TSR system 206. If the user at the portable computer 204 is listening, the portable computer 204, the headphone headsets 112, the microphone 116, and the tracking device 120 are collectively referred to as the listener TSR system 208.

The TSR system 200 has sample rates of 22.05 KHz or 41.1 KHz and the portable computers 202 and 204 have Audio Compression Managers (ACMs) for transparent run-time audio compression and decompression. The ACMs use a library of external codecs to convert audio data from one format to the other and allows selection of different codecs depending on bandwidth and latency requirements.

The TSR system 200 can be based on a computer network or an analog radio system capable of receiving several radio channels simultaneously. Various digital radio systems employing orthogonal frequency-division multiplexing are capable of receiving several frequencies simultaneously. In the TSR system 200 utilizing a band of analog radio channels, speakers could be assigned to a particular frequency based on whichever channels were not in use and had the least noise. The position of the speaker TSR system (e.g., GPS coordinates) could be repeatedly broadcast on a low bit rate orthogonal channel (<1 Kbs).

For indoor applications, other position sensing techniques or a combination of GPS and inertial navigation techniques are used.

For determining the orientation of the head of the user of the listener TSR system 208 relative to the speaker TSR system 206, the tracking device 120 is a 3-axis digital compass because the orientation of the head of the user may tilt as well as rotate. A 3-axis compass first determines the inclination of the compass, and then uses this to process the output of magnetic sensors in X, Y, and Z orientations into a compass heading. The compass should be placed at the top of the headphone band, since this reduces and balances the magnetic interference from the transducers in the headphone headset 112.

Convolving a single speaker with HRTFs using a 1.8 GHz processor in the portable computer uses less than 10% of the processor for 22.05 KHz sample rates, even though the HRTF processing is performed in C++ code without using specialized instructions for higher floating-point performance. Embedded signal processing to convert incoming monaural radio transmissions into binaural presentation for the listener only requires an inexpensive processor.

There are many different embodiments possible in the TSR system 200. These include those using different methods of HRTF selection and adjustment, HRTF storage, simulation of reflections and distance, control of the telescopic zoom settings, and volume level control. Other embodiments include different methods for graceful degradation with loss of position or orientation information, opportunities for virtual positioning, compatibility with legacy systems and the networking topology used. These will be disclosed in detail below.

For HRTF selection, the best match from the HRTF database in the portable computers 202 and 204 are desired. One common issue with the use of generic HRTFs is elevation mismatch due to ear pinnae differences. To null-out elevation mismatches, a manual elevation slider is provided on a graphical user interface in the portable computers 202 and 204 to shift the elevation index into the HRTF database by the amount specified by the user.

In other embodiments of the TSR system 200, users would need the ability to select between multiple HRTFs to find a good fit for their personal HRTF. However, it has been found that a relatively small number of HRTFs can provide a good fit for most. users. A selection among the most common 5 HRTFs provided a good fit for approximately 85% of users. In practice, users should be able to try out HRTFs in order of the most popular to the least popular, to minimize the number of evaluations required before being able to start using the TSR system 100. The ability to enter in the portable computers 202 and 204 relevant morphological information (like the user's age) would also be helpful in improving the efficiency of the fitting process.

In some cases a more complicated fitting process over a larger database might be required or in extreme cases users might want to be able to supply their own HRTF. In this case, HRTFs could be downloaded into the TSR system 200 either by short-range wireless radio (such as Bluetooth), infrared, or by the use of a flash memory card.

Finally, in cases where a proper fit could not be achieved due to time or other constraints, the TSR system 200 supports the disabling of spatial audio presentation. This would also be an important accommodation for people who had a significant hearing impairment, such as being deaf in one ear.

The storage requirement for one complete HRTF of 200 filter coefficients, 50 azimuths, and 25 elevations for both ears is about 2 megabytes. With continued scaling of Moore's Law this has recently become a relatively small amount of data to be stored in the portable computer 202 or 204.

Furthermore, HRTF databases contain a fair amount of redundancy, so they can be significantly reduced in size through data compression. It has been discovered that compression down to 33% of the original data set size are possible using ordinary compression techniques such as Lempel-Ziv (i.e., Unix compress or WinZip). Compression techniques tailored for the HRTF databases should be able to achieve even higher compression rates.

Nevertheless, even with generic compression techniques, the storage to contain 5 full HRTFs in compressed form could be accommodated in a small Flash memory. HRTFs may be loaded easily via a wireless connection or a flash memory card. Finally, the size of the HRTF database could be reduced by using HRTF interpolation techniques.

In order to provide the most effective user experience, even if users were in outdoor settings, the presence of the users in a shared physical room should be simulated. This is because reflections aid in creating a perception of spaciousness and creating the perception of direction. Basic reflections could include listener torso reflections and a first reflection from a simulated floor. More extensive modeling of reverberation could also be used to help indicate relative distances.

It has been discovered that it is possible to convey a perception of relative distance by signal processing of the audio waveforms presented to the listener; however people are not as accurate in perceiving distances as they are in perceiving directions. This processing would modify the timbre and volume of the waveform. There is usually no point in simulating the actual distance, since speakers may be many miles apart. Also, there are limitations on how much a speaker's voice can be attenuated without reducing its intelligibility. However, within limited ranges, some perception of relative distance could be simulated.

As explained above, the TSR system 200 maintains the relative orientation of speakers and listeners, but at seemingly much reduced distances in a fashion similar to optical telescopes that make objects at given headings appear closer. It has been discovered that this can be accomplished by processing the voice signal using the positioning information to provide telescopic binaural sound at the listener location having a simulated spatial relationship based on the position information of the speaker TSR system 206 relative to the listener TSR system 208.

It has also been discovered that the distance to the furthest speaker or to the furthest speaker who is intelligible could be ratioed to a maximum distance without resulting in unacceptable intelligibility degradation, and speakers closer than this could be presented as being closer by the same ratio. For example if the maximum simulated distance was 25 feet, and the distance to the furthest user was 25 miles, all speakers could be rendered to be at a perceived distance of one foot from the listener per each actual mile. Other linear or nonlinear mappings may be used as well.

It has also been discovered that it is also possible to control the magnification of sounds from distant speakers either manually or automatically in a similar fashion to a zoom lens on a telescope.

In the manual zoom, the listener is given a control on the portable computer 204 that allows setting the falloff of sound with distance. By varying this control the listener could restrict hearing to varying radii around the listener's position. This is useful in cases where the TSR system 200 many be in use by many teams of people over a large area. For example, fire fighters in a large city such as New York fighting a fire in teams in a large building.

In the automatic zoom, the portable computer 204 automatically and dynamically varies the simulated spatial distance depending on some function, such as the number of active speakers. With automatic zoom, the sound falls off slowly with actual distance when there are few active speakers, but when there are many active speakers, sounds is processed to fall-off more rapidly with actual distance.

The listener using the cocktail party effect can also select the falloff rate on the portable computer 204 so that the number of active speakers heard by the user would not exceed the number of conversations discernible. Hence, the fall-off function could also be a function of the relative position and distances to the speakers. For example, if many equal-loudness speakers were spread optimally around a listener the falloff with distance could be reduced.

In many radio systems, the goal is to present both close and distant speakers with the same loudness. This is accomplished through the use of automatic gain control at one or more points in the system. However, in the TSR system 200, depending on the dynamic range of the communication channel and the ambient noise levels experienced by the users, it has been discovered that it is better to use volume levels closer to calibrated signal levels. In this case, speakers who were speaking very loudly would be perceived as speaking more loudly than those who were speaking softly. Thus, even at distances beyond those normally intelligible based on the set zoom level, loud discourses or shouts could be heard and understood. The level control in the portable computer 204 varies automatically from calibrated to compressed based on the ambient noise level.

The volume of the speaker is also made dependent on the orientation of the speaker, similar to the case where the speaker and listener are physically co-located. In this way, a speaker could selectively direct his/her voice to different listeners depending on the orientation of his/her head or via user interface controls. The directivity is also a function of the virtual room reverberation model being used.

Since the speaker is also a listener, he/she already has head orientation sensing. If the speaker loudness was also made dependent on the speaker's head orientation, orientation information is also sent on the same orthogonal data channel as the speaker's position information. This would require an insignificant amount of additional bandwidth (only a few dozen bits/sec could suffice). Since the directivity of human speakers is more uniform among different speakers than HRTFs, only a single data set specifying directivity with azimuth and elevation would be required. Even if this were frequency-dependent, this would require data storage less than or equal to an HRTF.

Because the spatial audio presentation in TSR is dependent on position information from the speaker and listener tracking devices 118 and 120 as well as the orientation information of the listener tracking device 120, loss of this position information has implications for the TSR system operation.

If a user goes indoors (in a location without indoor GPS repeaters), loss of position information could occur. However, in order to measure the user's head orientation with a 3-axis compass, X and Y accelerations must be measured. If Z accelerations are measured as well, and all three accelerations are integrated, this forms the basis of an inertial navigation system, which is used to approximate a listener's position when out of contact with GPS (or other primary position tracking system).

Because inertial navigation has drift and other errors that can accumulate over time, the precision of the position approximation will degrade with time. The expected error bounds on position can also be broadcast on the orthogonal data channel requiring very little additional bandwidth. If the error becomes significant relative to the position of a listener (e.g., it could cause the speaker to be noticeably either to the right or left of the listener), then spatial presentation of that speaker's voice could be disabled for the listener by the portable computer 204. Spatial audio presentation would also need to be disabled in cases where the system had obtained no primary position information since being powered on. In this case the position uncertainty would be set to its maximum value.

The loss of orientation information is less likely than the loss of position information since compasses also work indoors. However, large magnets, electric currents, or ferrous structures can affect compass headings, and this could cause errors in the orientation information. In extreme environments, magnetic sensing could be augmented with the speaker and listener tracking devices 118 and 120 of FIG. 1 that include angular rate gyroscopes, similar to the augmentation of GPS with inertial navigation as described above. Good quality electronic gyroscopes are very inexpensive.

A virtual positioning control is provided in the portable computers 202 and 204 so that listeners and speakers do not have to be limited to their actual physical position. For example, a fire chief might want to participate in operations from the auditory vantage point of being in the thick of things, rather than being off to one side. Thus, the TSR system 200 allows a user to specify either an absolute virtual position or a virtual position relative to his/her actual physical position.

Similarly, on a battlefield where a remote senior commander would want the vantage point of a field commander or a team, the virtual position could be set to automatically "tag along" with a particular speaker, or to automatically be centered in the middle of recent speakers.

In a digital system, all users are likely to be using compatible systems. However, if TSR capabilities are overlaid on traditional analog communication channels (using techniques similar to those utilized by the Radio Data System of the British Broadcasting Corporation), some users with older equipment may not be able to transmit their position (and optionally orientation) data. In other cases, if there were large amounts of radio interference, transmission over long distances, or obstacles to radio transmission, analog voice signals might be intelligible but the orthogonal data transmission might be lost. In both these cases, the speech of speakers would not be able to be spatialized, but would be presented equally to both ears of the listener as monaural sound.

Figure 3:
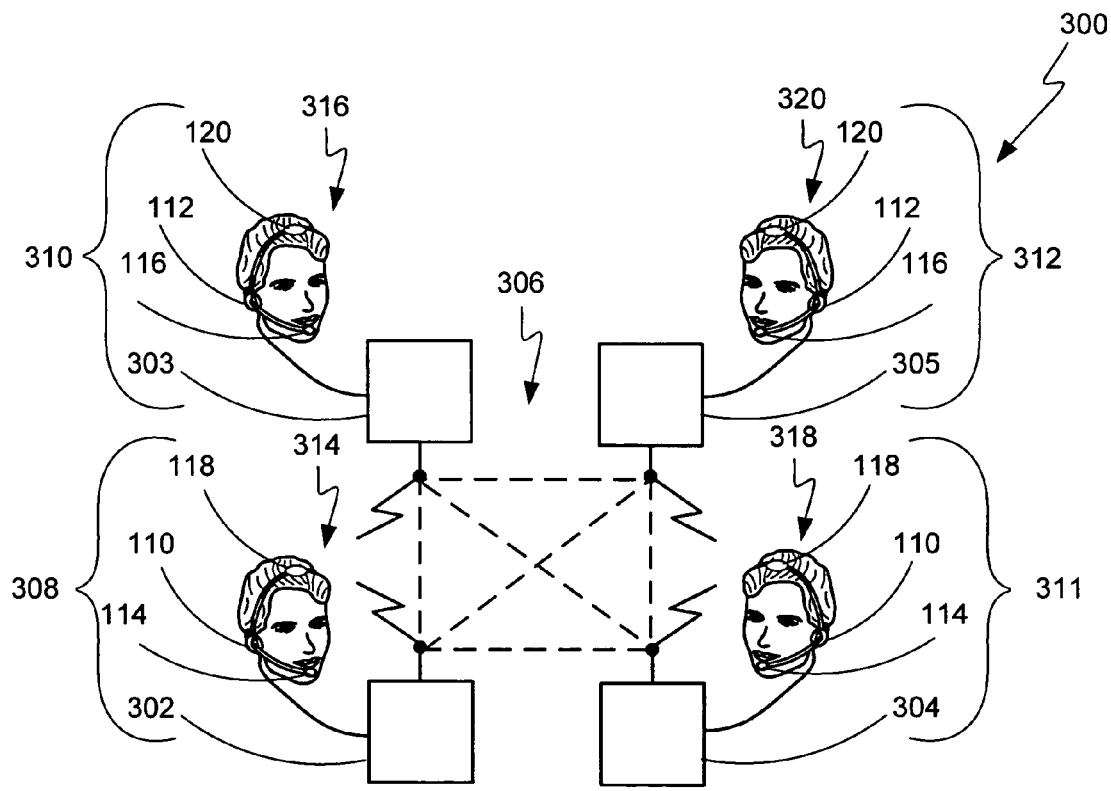
FIG. 3 is a distributed TSR system in accordance with a further embodiment of the present invention.

Referring now to FIG. 3, therein is shown a distributed TSR system 300 in accordance with a further embodiment of the present invention. In the distributed TSR system 300, each TSR device, for example portable computers 302 to 305, can either send its user's voice, position, and orientation information to another TSR device individually or to the group via multicasting.

Each user receives audio from every active speaker and processes it based on HRTFs and combines it locally. This requires more local computing power than for the centralized TSR system 200 of FIG. 2, especially in the case of multiple simultaneous speakers, but eliminates the need for a centralized server. Multicasting (for computing networks) or broadcasting (for radio systems), generically referred to as communication network 306, can be used with the distributed TSR system 300 so that the audio of each speaker needs to be transmitted only once. If multicasting is not used, the network transmissions per speaker TSR system 308 could go up as the number of active listeners on listener TSR systems 310 to 312. As an example, the speaker is shown at speaker location 314 and the listeners are shown at listener locations 316, 318, and 320; but speakers could also be at speaker locations 314, 316, and 318 with the listener at the listener location 320.

Using multicasting 306 for sending audio from speakers reduces the network bandwidth. In the multicasting 306, the bandwidth requirement for the speaker TSR system 308 is the same regardless of the number of listener TSR systems. The speaker TSR system 308 sends streaming audio to a particular IP-Multicast address to which all the listener TSR systems subscribe. The substantial bandwidth savings from multicasting 306 also helps to reduce network congestion and load on the TSR systems, and it enables the participation of potentially thousands of listeners.

Telescopic Spatial Radio's ability to augment the user's situational awareness with the headings of the speaking users can be valuable in many applications. For example, in aviation, the direction of speakers can be crucial. With TSR when an airplane has passed over a control tower the voice of the controller would be perceived as passing below and behind the pilot. Pilots speaking from other planes around the pilot could also be heard speaking from the directions of their airplanes. The voice telescoping also provides a sense of the actual spatial relationships of the pilots and how quickly the pilots are closing with the controller/airport. This technology would also have applications in military communications and could reduce the incidence of friendly fire.

Although not life-critical, the ability to enjoy directional spatial audio at a distance for a modest additional cost could enhance the rich media experience of users in many different communications applications. For example, many cellphones are being augmented with GPS capabilities for emergency 911 telephone services. If electronic compasses were also included, then cellphones would have the tracking capabilities required for implementation of the various TSR systems. Thus, the TSR systems could aid people in meeting each other in crowded locations, or allow multiple distributed people to chat with each other.

TSR can naturally convey multiple speakers' headings to listeners over large distances. TSR can also support discrimination among simultaneously speaking users at different headings via human perceptual abilities (i.e., the "cocktail party effect"), The orientation and position tracking technologies required to implement TSR are available today and are rapidly decreasing in cost. Furthermore, signal processing to convert incoming monaural radio transmissions into binaural presentation requires only modest computational re-sources.

Figure 4:
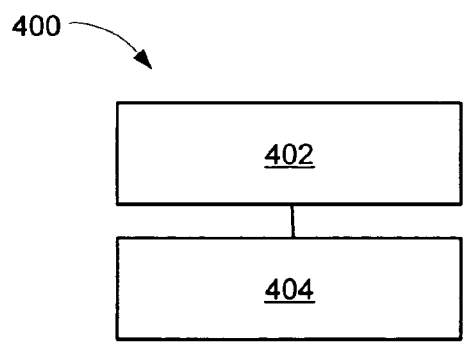
FIG. 4 is a flow chart of a telescopic spatial radio system 400 in accordance with an embodiment of the present invention.

Referring now to FIG. 4, therein is shown a flow chart of a telescopic spatial radio system 400 in accordance with an embodiment of the present invention. The system 400 includes sending a signal representative of a sound at a speaker location to a listener location, the signal providing positioning information of the speaker location relative to the listener location in a block 402; and processing the signal using the positioning information to provide telescopic binaural sound at the listener location having a simulated spatial relationship based on the position information of the speaker location relative to the listener location in a block 404.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

The invention claimed is:

1. A telescopic spatial radio method comprising:
sending a signal representative of a sound at a speaker location to a listener location, the signal providing positioning information of the speaker location relative to the listener location;
processing the signal using the positioning information to provide telescopic binaural sound at the listener location having a simulated spatial relationship based on the position information of the speaker location relative to the listener location;
providing the binaural sound to have simulated spatial relationships based on the positions and distances of a plurality of speaker locations relative to the listener location;
zooming in or out the binaural sound to a simulated distance among the plurality of speaker locations and the listener location based on the number of speaker locations, sound volumes from the speaker locations, distances of the speaker locations, positions of the speaker locations, or a combination thereof to the listener location; and
generating audible output of the telescopic binaural sound at the listener location.

2. The method as claimed in claim 1 wherein processing the signal comprises:
providing the binaural sound to have simulated spatial relationships based on the position information of a plurality of speaker locations relative to the listener location; and
simulating distances for the simulated spatial relationships between each of the plurality of speaker locations and the listener location using ratios based on the furthest distance intelligible speaker location.

3. The method as claimed in claim 1 further comprising:
approximating the position of the speaker location or the listener location when the positioning information of the speaker location relative to the listener location cannot be determined.

4. The method as claimed in claim 1 further comprising:
providing a virtual position of the speaker location or the listener location; and
processing the signal to have the simulated spatial relationship conform to the virtual position.

5. A telescopic spatial radio method comprising:
sending a signal representative of a sound at a speaker location to a listener location, the signal providing positioning information of the speaker location relative to the listener location;
processing the signal using the positioning information to provide telescopic binaural sound at the listener location having a simulated spatial relationship based on the position information of the speaker location relative to the listener location; and
generating audible output of the telescopic binaural sound at the listener location;
wherein the processing comprises automatically adjusting, without user input, a magnification of the telescopic binaural sound based upon a number of active speakers.

6. The method as claimed in claim 1 further comprising receiving user input with respect to a zoom control to define a radius about the listener location, and wherein the generating comprises generating the audible output of the telescopic binaural sound at the listener location as a result of the speaker location being within the radius defined by the user input.

7. The method as claimed in claim 6 further comprising receiving another signal at the listener location which was transmitted from another speaker location outside of the radius, and not generating audible output of the another signal as a result of the another speaker location being outside of the radius.

8. The method as claimed in claim 1 wherein the processing comprises processing to provide the telescopic binaural sound having the simulated spatial relationship based on the position information of the speaker location relative to the listener location, and wherein at least one of the speaker location and the listener location is a virtual location which does not correspond to a physical position of a respective one of a speaker of the sound and a listener of the sound.

9. The method as claimed in claim 1 further comprising:
receiving user input with respect to a zoom control to define a radius about the listener location; and
providing the telescopic binaural sound at the listener location as a result of the speaker location being within the radius defined by the user input.

10. A telescopic spatial radio method comprising:
sending a signal representative of a sound at a speaker location to a listener location, the signal providing positioning information of the speaker location relative to the listener location, the signal connected by a wireless network in a centralized, a distributed, or a combination centralized and distributed network connection between the speaker location and the listener location;
processing the signal using the positioning information to provide a telescopic zoomable binaural sound manually, automatically, and manually and automatically adjustable at the listener location having a simulated spatial relationship based on the position information and head orientation information of a listener at the listener location;
processing the signal to provide monaural sound when no positioning information is available at the listener location; and
generating audible output of at least one of the telescopic zoomable binaural sound and the monaural sound at the listener location.

11. The method as claimed in claim 3 further comprising:
providing a virtual position of the speaker location or the listener location, the virtual position set manually or set automatically to remain proximate the speaker location; and
processing the signal to have the simulated spatial relationship conform to changes in the virtual position.

12. A telescopic spatial radio (TSR) system comprising:
a speaker TSR system for sending a signal representative of a sound at a speaker location to a listener location, the signal providing positioning information of the speaker location relative to the listener location; and
a listener TSR system for processing the signal using the positioning information to provide a telescopic binaural sound at the listener location having a simulated spatial relationship based on the position information of the speaker location relative to the listener location;
the listener TSR system further comprising:
a processor for providing the binaural sound to have simulated spatial relationships based on the positions and distances of a plurality of speaker locations relative to the listener location; and
a zoom control for zooming in or out the binaural sound to a simulated distance among the plurality of speaker locations and the listener location based on the number of speaker locations, sound volumes from the speaker locations, distances of the speaker locations, positions of the speaker locations, or a combination thereof to the listener location.

13. The system as claimed in claim 12 wherein the listener TSR system comprises:
a processor for providing the binaural sound to have simulated spatial relationships based on the position information of a plurality of speaker locations relative to the listener location; and
the processor for simulating distances for the simulated spatial relationships between each of the plurality of speaker locations and the listener location using ratios based on the furthest distance intelligible speaker location.

14. The system as claimed in claim 12 wherein the speaker TSR system or the listener TSR system comprises:
a position sensing system for approximating the position of the speaker location or the listener location when the positioning information of the speaker location relative to the listener location cannot be determined.

15. The system as claimed in claim 12 wherein the listener TSR system comprises:
a virtual position control for providing a virtual position of the speaker location or the listener location; and
a processor for processing the signal to have the simulated spatial relationship conform to the virtual position.

16. The system as claimed in claim 12 wherein the listener TSR system comprises a zoom control configured to receive user input which defines a radius around a position of the listener TSR system to prevent generation of sound by the listener TSR system as a result of signals received from sources which are located outside of the radius.

17. A telescopic spatial radio (TSR) system comprising:
a speaker TSR system for sending a signal representative of a sound at a speaker location to a listener location, the signal providing positioning information of the speaker location relative to the listener location, the signal connected by a wireless network in a centralized, a distributed, or a combination centralized and distributed network connection between the speaker location and the listener location; and
a listener TSR system for processing the signal using the positioning information to provide a telescopic zoomable binaural sound manually, automatically, and manually and automatically adjustable at the listener location having a simulated spatial relationship based on the position information and head orientation information of a listener at the listener location, the listener TSR system for processing the signal to provide monaural sound when no positioning information is available at the listener location.

18. The system as claimed in claim 17 wherein the listener TSR system comprises:
a processor for providing the binaural sound to have simulated spatial relationships based on the position information of a plurality of speaker locations relative to the listener location;
the processor for further processing the binaural signal using the head orientation information and a head-related transfer function; and
the processor for simulating distances for the simulated spatial relationships between each of the plurality of speaker locations and the listener location using ratios based on the furthest distance intelligible speaker location.

19. The system as claimed in claim 17 wherein the listener TSR system comprises:
a processor for providing the binaural sound to have simulated spatial relationships based on the positions and distances of a plurality of speaker locations relative to the listener location;
a zoom control for zooming in or out the binaural sound to a simulated distance among the plurality of speaker locations and the listener location manually or based on the number of speaker locations, sound volumes from the speaker locations, distances of the speaker locations, positions of the speaker locations, or a combination thereof to the listener location.

20. The system as claimed in claim 17 wherein the speaker TSR system further comprises:
a position sensing system for approximating the position of the speaker location or the listener location when the positioning information of the speaker location relative to the listener location cannot be determined; and
a processor for providing expected position error information with the signal; and
the listener TSR system further comprises:
a processor for disabling the providing of the binaural sound while the position error information indicates a position error larger than a predetermined distance.

21. The system as claimed in claim 17 the listener TSR system further comprises:
a virtual position control for providing a virtual position of the speaker location or the listener location, the virtual position set manually or set automatically to remain proximate the speaker location; and
a processor for processing the signal to have the simulated spatial relationship conform to changes in the virtual position.

* * * * *